United States Patent
Kim et al.

(10) Patent No.: US 11,539,098 B2
(45) Date of Patent: Dec. 27, 2022

(54) VENTING DEVICE AND METHOD FOR MANUFACTURING THE SAME

(71) Applicant: LG Chem, Ltd., Seoul (KR)

(72) Inventors: Na Yoon Kim, Daejeon (KR); Yong Su Choi, Daejeon (KR); Sang Hun Kim, Daejeon (KR); Hyung Kyun Yu, Daejeon (KR); Soo Ji Hwang, Daejeon (KR)

(73) Assignee: LG Energy Solution, Ltd.

( * ) Notice: Subject to any disclaimer, the term of this patent is extended or adjusted under 35 U.S.C. 154(b) by 548 days.

(21) Appl. No.: 16/637,538

(22) PCT Filed: Jan. 23, 2019

(86) PCT No.: PCT/KR2019/000972
§ 371 (c)(1),
(2) Date: Feb. 7, 2020

(87) PCT Pub. No.: WO2019/216520
PCT Pub. Date: Nov. 14, 2019

(65) Prior Publication Data
US 2020/0259146 A1  Aug. 13, 2020

(30) Foreign Application Priority Data
May 10, 2018  (KR) ........................ 10-2018-0053797

(51) Int. Cl.
*H01M 50/333*  (2021.01)
*H01M 50/317*  (2021.01)
*F16K 17/04*  (2006.01)

(52) U.S. Cl.
CPC ....... *H01M 50/317* (2021.01); *F16K 17/0406* (2013.01); *F16K 17/0466* (2013.01); *F16K 17/0493* (2013.01)

(58) Field of Classification Search
CPC ............ F16K 17/0406; F16K 17/0466; F16K 17/0493; H01M 50/317
See application file for complete search history.

(56) References Cited

U.S. PATENT DOCUMENTS

| 7,285,334 B1 | 10/2007 | Yamashita et al. |
| 9,397,325 B2 * | 7/2016 | Kinuta ................ H01M 50/333 |

(Continued)

FOREIGN PATENT DOCUMENTS

| CN | 201353106 Y | 12/2009 |
| CN | 103597631 A | 2/2014 |

(Continued)

OTHER PUBLICATIONS

Extended European Search Report including Written Opinion for Application No. EP19800490.5, dated Sep. 21, 2020, pp. 1-8.

(Continued)

*Primary Examiner* — P. Macade Nichols
(74) *Attorney, Agent, or Firm* — Lerner, David, Littenberg, Krumholz & Mentlik, LLP

(57) ABSTRACT

To solve the above problem, a venting device inserted into a sealing part of a pouch of a secondary battery according to the present invention includes: a housing inserted between confronting surfaces of the sealing part and sealed together with the sealing part; an element made of a metal and disposed in the housing and through which a passage is defined providing gas communication between an inside and an outside of the pouch; and a ball disposed at an outlet-side of the passage, the ball configured to open and close the passage, wherein, in the element, an edge of an inner circumference of a surface of the outlet-side of the passage is chamfered or filleted so as to face the ball, and the element includes: a surface treatment layer formed on the chamfered (Continued)

or filleted surface; and a layer made of a polymer and fused to the surface treatment layer.

15 Claims, 14 Drawing Sheets

(56) References Cited

U.S. PATENT DOCUMENTS

| | | | |
|---|---|---|---|
| 2002/0047025 A1 | 4/2002 | Ray |
| 2008/0185550 A1 | 8/2008 | Hall |
| 2010/0239895 A1 | 9/2010 | Yang et al. |
| 2014/0120387 A1 | 5/2014 | Kinuta et al. |
| 2016/0036024 A1 | 2/2016 | Choi et al. |

FOREIGN PATENT DOCUMENTS

| | | |
|---|---|---|
| EP | 1102336 B1 | 9/2007 |
| EP | 2709191 A1 | 3/2014 |
| JP | 2003068269 A | 3/2003 |
| JP | 2010503150 A | 1/2010 |
| JP | 2010135247 A | 6/2010 |
| JP | 2011001892 A | 1/2011 |
| KR | 20140053010 A | 5/2014 |
| KR | 20150061996 A | 6/2015 |
| KR | 20160014828 A | 2/2016 |
| KR | 20160051037 A | 5/2016 |
| KR | 20170000070 A | 1/2017 |

OTHER PUBLICATIONS

Search Report dated Nov. 23, 2021 from the Office Action for Chinese Application No. 2019800037030 dated Dec. 1, 2021, 3 pgs.
International Search Report for Application No. PCT/KR2019/000972 dated Apr. 23, 2019, 3 pages.

* cited by examiner under 35 U.S.C. § 371 of International Patent Application No. PCT/KR2019/000972, filed on Jan. 23, 2019, published in Korean, which claims priority from Korean Patent Application No. 10-2018-0053797, filed on May 10, 2018, the disclosures of which are hereby incorporated herein by reference in their entireties.

VENTING DEVICE AND METHOD FOR MANUFACTURING THE SAME

CROSS-REFERENCE TO RELATED APPLICATION

The present application is a national phase entry under 35 U.S.C. § 371 of International Patent Application No. PCT/KR2019/000972, filed on Jan. 23, 2019, published in Korean, which claims priority from Korean Patent Application No. 10-2018-0053797, filed on May 10, 2018, the disclosures of which are hereby incorporated herein by reference in their entireties.

TECHNICAL FIELD

The present invention relates to a venting device and a method for manufacturing the same, and more particularly, to at least one venting device, which is inserted into a sealing part of a pouch of a secondary battery to discharge an internal gas when an internal pressure of the pouch increases so as to adjust the internal pressure, and a method for manufacturing the same.

BACKGROUND ART

In general, secondary batteries include nickel-cadmium batteries, nickel-hydrogen batteries, lithium ion batteries, and lithium ion polymer batteries. Such a secondary battery is being applied to and used in small-sized products such as digital cameras, P-DVDs, MP3Ps, mobile phones, PDAs, portable game devices, power tools, E-bikes, and the like as well as large-sized products requiring high power such as electric vehicles and hybrid vehicles, power storage devices for storing surplus power or renewable energy, and backup power storage devices.

Such a secondary battery is classified into a pouch type secondary battery and a can type secondary battery according to a material of a case accommodating the electrode assembly. In the pouch type secondary battery, an electrode assembly is accommodated in a pouch made of a flexible polymer material. Also, in the can type secondary battery, an electrode assembly is accommodated in a case made of a metal or plastic material.

In the secondary battery, a gas may be generated by internal short-circuit, overcharging, overdischarging, or the like due to an external impact. In addition, when the secondary battery is stored at a high temperature, an electrochemical reaction between an electrolyte and an electrode active material is quickly accelerated by the high temperature to generate a gas.

Here, the generated gas may allow the secondary battery to increase in internal pressure to cause problems such as weakening of bonding force between components, damage of a case of the secondary battery, an early operation of a protection circuit, deformation of an electrode, internal short-circuit, explosion, and the like. To prevent these phenomena, in the case of the can type secondary battery, a protection member such as a CID filter and a safety vent is provided. Thus, when the pressure within the case increases, electrical connection may be physically interrupted. However, in the case of the pouch type secondary battery according to the related art, the protection member is not sufficiently provided.

DISCLOSURE OF THE INVENTION

Technical Problem

An object to be solved by the present invention is to provide at least one venting device, which is inserted into a sealing part of a pouch of a secondary battery to discharge an internal gas when an internal pressure of the pouch increases so as to adjust the internal pressure, and a method for manufacturing the same.

The objects of the present invention are not limited to the aforementioned object, but other objects not described herein will be clearly understood by those skilled in the art from descriptions below.

Technical Solution

To solve the above problem, a venting device inserted into a sealing part of a pouch of a secondary battery according to the present invention includes: a housing inserted between confronting surfaces of the sealing part and sealed together with the sealing part; an element made of a metal and disposed in the housing and through which a passage is defined providing gas communication between an inside and an outside of the pouch; and a ball disposed at an outlet-side of the passage, the ball being configured to open and close the passage, the ball having a lower position contacting the element and an upper position spaced apart from the element, wherein, in the element, an edge of an inner circumference of a surface of the outlet-side of the passage is chamfered or filleted so as to face the ball, and the element includes: a surface treatment layer formed on the chamfered or filleted surface; and a contact layer made of a polymer and fused to the surface treatment layer.

The venting device may further include a plate spring surrounding the ball and the element and having elasticity, the plate spring and the ball together being configured to open and close the passage according to an internal pressure of the pouch.

Also, the plate spring may have a cap shape that is convex outward and form an insertion space therein into which the element is inserted.

Also, the plate spring may include a central portion and a peripheral portion extending outward from the central portion, and a gas exhaust hole may extend through the peripheral portion of the plate spring.

Also, an end of the plate spring may be bent toward the element that is inserted into the insertion space.

Also, the polymer may include an acid-treated polyolefin-based polymer.

Also, the metal may include aluminum or stainless steel.

Also, the surface treatment layer may include at least one of: chromium, zirconium, and titanium.

Also, the housing may include an upper housing and a lower housing, and the upper housing and the lower housing may have shapes or sizes different from each other.

Also, the lower housing may have a width less than a width of the upper housing, the width of the lower housing and the width of the upper housing being defined in a lateral direction perpendicular to a longitudinal flow direction of the passage defined through the element.

Also, the upper housing may have a circular cylinder shape, and the lower housing may have an oval cylinder shape.

To solve the above problem, a method for manufacturing a venting device inserted into a sealing part of a pouch of a secondary battery according to an embodiment of the present invention includes: a step of manufacturing an element made of a metal, through which a passage is defined, and in which an edge of an inner circumference of a surface of an outlet-side of the passage is chamfered or filleted; a step of forming a surface treatment layer on the chamfered or filleted surface of the element; a step of fusing a film made of a polymer to the surface treatment layer; and a step of seating a spherical-shaped ball onto the fused film.

Also, the step of forming the surface treatment layer may include: a step of debinding the element; a primarily washing step; an etching step; a secondarily washing step; a surface treatment step; a tertiarily washing step; and a drying step.

Also, the surface treatment step may include a step of performing one of: chromate treatment, zirconia treatment, and titanium treatment.

Also, the method may further include, after the step of seating the ball: a step of placing a plate spring having a cap shape around the element and the spherical-shaped ball; and a step of inserting the element into a housing, the housing being inserted between confronting surfaces of the sealing part so as to be sealed together with the sealing part.

Particularities of other embodiments are included in the detailed description and drawings.

Advantageous Effects

The embodiments of the present invention may have at least the following effects.

Even though all the ball and the sheet are made of the metal, the adhesion between the ball and the sheet may be improved to improve the sealability when the passage is closed.

The effects of the prevent invention are not limited by the aforementioned description, and thus, more varied effects are involved in this specification.

MODE FOR CARRYING OUT THE INVENTION

Figure 1:
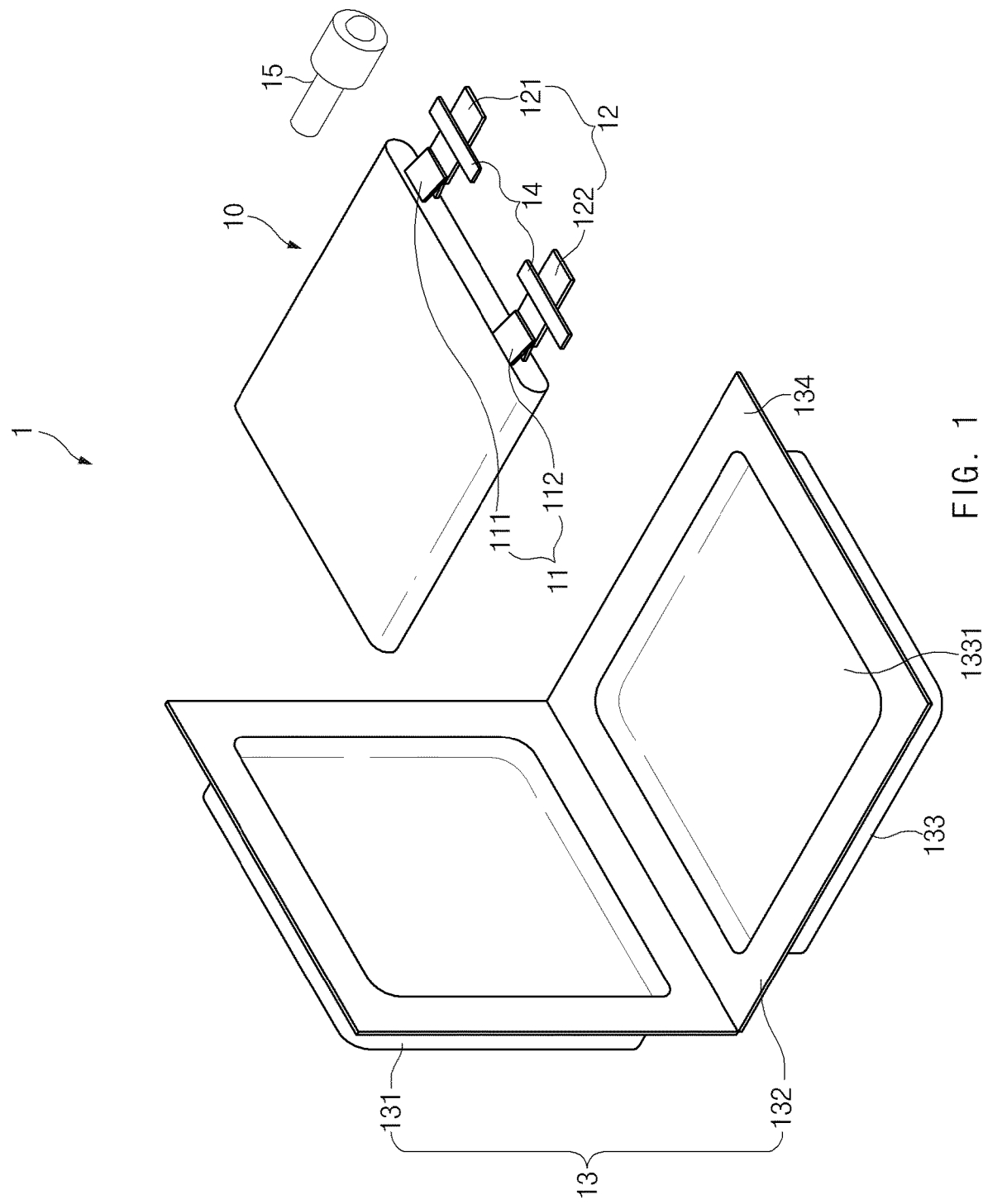
FIG. 1 is an assembled view of a secondary battery including a venting device according to an embodiment of the present invention.

Advantages and features of the present disclosure, and implementation methods thereof will be clarified through following embodiments described with reference to the accompanying drawings. The present invention may, however be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. Like reference numerals refer to like elements throughout.

Unless terms used in the present invention are defined differently, all terms (including technical and scientific terms) used herein have the same meaning as generally understood by those skilled in the art. Also, unless defined clearly and apparently in the description, the terms as defined in a commonly used dictionary are not ideally or excessively construed as having formal meaning.

In the following description, the technical terms are used only for explaining a specific exemplary embodiment while not limiting the present invention. In this specification, the terms of a singular form may comprise plural forms unless specifically mentioned. The meaning of "comprises" and/or "comprising" does not exclude other components besides a mentioned component.

Hereinafter, preferred embodiments will be described in detail with reference to the accompanying drawings.

Figure 2:
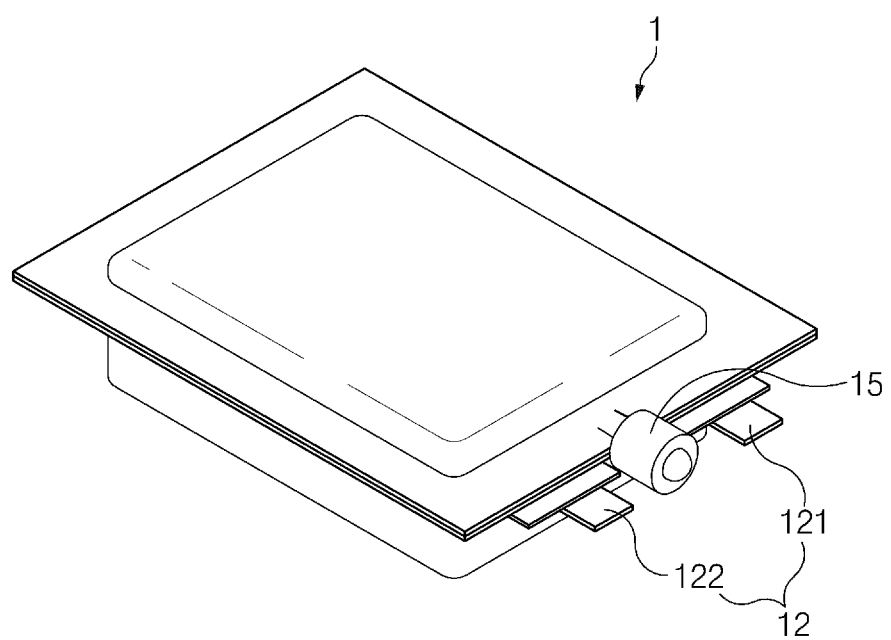
FIG. 2 is a perspective view of the secondary battery of FIG. 1, which is completely manufactured.

FIG. 1 is an assembled view of a secondary battery 1 including a venting device 15 according to an embodiment of the present invention, and FIG. 2 is a perspective view of the secondary battery 1 of FIG. 1, which is completely manufactured.

In order to manufacture the secondary battery 1 according to an embodiment of the present invention, first, electrode active material slurry is applied to a positive electrode collector and a negative electrode collector to manufacture a positive electrode and a negative electrode. Then, the electrodes are laminated on both sides of a separator to form an electrode assembly 10 having a predetermined shape. Then, the electrode assembly 10 is accommodated in a battery case 13, and also, an electrolyte is injected into the battery case 13 to perform sealing on the battery case 13.

As illustrated in FIG. 1, the electrode assembly 10 includes an electrode tab 11. The electrode tab 11 is connected to each of a positive electrode and a negative electrode of the electrode assembly 10 to protrude to the outside of the electrode assembly 10, thereby providing a path, through which electrons are moved, between the inside and outside of the electrode assembly 10. The electrode collector of the electrode assembly 10 is constituted by a portion coated with the slurry and a distal end, on which the slurry is not applied, i.e., a non-coating portion. Also, the electrode tab 11 may be formed by cutting the non-coating portion or by connecting a separate conductive member to the non-coating portion through ultrasonic welding. As illustrated in FIG. 1, the electrode tabs 11 may protrude from one side of the electrode assembly 10 in the same direction, but the present invention is not limited thereto. For example, the electrode tabs 11 may protrude in directions different from each other.

In the electrode assembly 10, the electrode lead 12 is connected to the electrode tab 11 through spot welding. Also, a portion of the electrode lead 12 is surrounded by an insulation part 14. The insulation part 14 may be disposed to be limited within a sealing part 134, at which an upper pouch 131 and a lower pouch 132 of the battery case 13 are thermally fused, so that the electrode lead 12 is bonded to the battery case 13. Also, electricity generated from the electrode assembly 10 may be prevented from flowing to the battery case 13 through the electrode lead 12, and the sealing of the battery case 13 may be maintained. Thus, the insulation part 14 may be made of a nonconductor having non-conductivity, which is not electrically conductive. In general, although an insulation tape which is easily attached to the electrode lead 12 and has a relatively thin thickness is mainly used as the insulation part 14, the present invention is not limited thereto. For example, various members may be used as the insulation part 14 as long as the members are capable of insulating the electrode lead 12.

The electrode lead 12 may extend in the same direction or extend in directions different from each other according to the formation positions of the positive electrode tab 111 and the negative electrode tab 112. The positive electrode lead 121 and the negative electrode lead 122 may be made of materials different from each other. That is, the positive electrode lead 121 may be made of the same material as the positive current collector, i.e., an aluminum (Al) material, and the negative electrode lead 122 may be made of the same material as the negative current collector, i.e., a copper (Cu) material or a copper material coated with nickel (Ni). Also, a portion of the electrode lead 12, which protrudes to the outside of the battery case 13, may be provided as a terminal part and electrically connected to an external terminal.

In the pouch type secondary battery 1 according to an embodiment of the present invention, the battery case 13 may be a pouch made of a flexible material. Hereinafter, the case in which the battery case 13 is the pouch will be described. Also, the battery case 13 accommodates the electrode assembly 10 so that a portion of the electrode lead 12, i.e., the terminal part is exposed and then is sealed. As illustrated in FIG. 1, the battery case 13 includes the upper pouch 131 and the lower pouch 132. A cup part 133 having an accommodation space 1331 accommodating the electrode assembly 10 is formed in the lower pouch 132, and the upper pouch 131 covers an upper portion of the accommodation space 1331 to prevent the electrode assembly 10 from being separated to the outside of the battery case 13. Here, as illustrated in FIG. 1, the cup part 133 having the accommodation space 1331 may be formed in the upper pouch 131 to accommodate the electrode assembly 10 in the upper portion. As illustrated in FIG. 1, one side of the upper pouch 131 and one side of the lower pouch 132 may be connected to each other. However, the present invention is not limited thereto. For example, the upper pouch 131 and the lower pouch may be separately manufactured to be separated from each other.

After the upper pouch 131 and the lower pouch 132 of the battery case 13 contact each other, the sealing part 134 formed on an edge may be sealed. Here, as illustrated in FIG. 1, according to an embodiment of the present invention, the venting device 15 is inserted between both surfaces of the sealing part 134 so as to be sealed together with the sealing part 134 and thus be fixed within the sealing part 134. Also, the venting device 15 includes a passage through which the inside and the outside of the battery case 13 communicate with each other. When an internal pressure of the battery case 13 increases, an internal gas is discharged to the outside to adjust the pressure. The venting device 15 will be described below in detail.

When the electrode lead 12 is connected to the electrode tab 11 of the electrode assembly 10, and the insulation part 14 is provided on a portion of the electrode lead 12, the electrode assembly 10 may be accommodated in the accommodation space 1331 provided in the lower pouch 132, and the upper pouch 131 may cover the upper side of the accommodation space 1331. Also, when the electrolyte is injected, and the sealing part 134 provided on the edge of each of the upper pouch 131 and the lower pouch 132 is sealed, the secondary battery 1 is manufactured as illustrated in FIG. 2.

Figure 3:
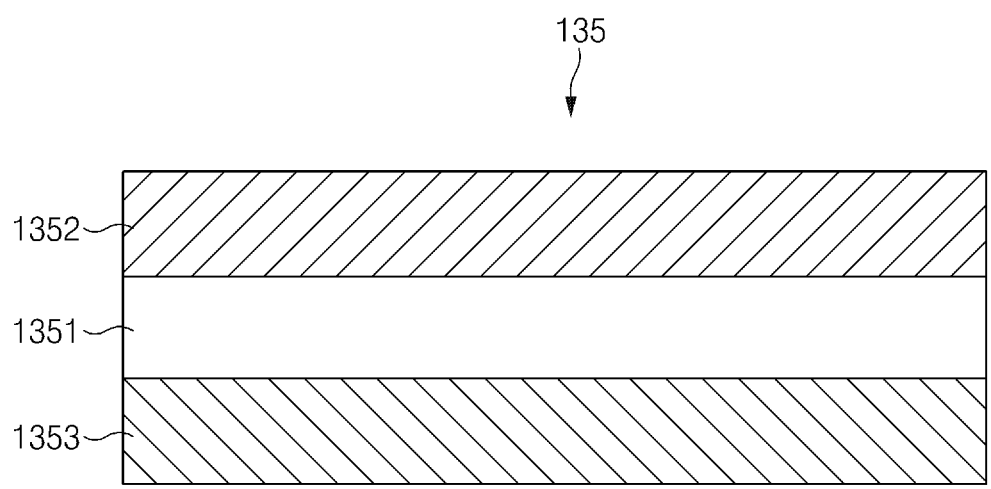
FIG. 3 is a cross-sectional view of a battery case according to an embodiment of the present invention.

FIG. 3 is a cross-sectional view of the battery case 13 according to an embodiment of the present invention.

The battery case 13 is manufactured by performing drawing on the pouch film 135. That is, the pouch film 135 is elongated to form the cup part 133, thereby manufacturing the battery case 13. As illustrated in FIG. 3, the pouch film 135 includes a gas barrier layer 1351, a surface protection layer 1352, and a sealant layer 1353.

The gas barrier layer 1351 may secure mechanical strength of the battery case 13, block introduction and discharge of a gas or moisture outside the secondary battery 1, and prevent the electrolyte from leaking. In general, the gas barrier layer 1351 includes a metal. Particularly, aluminum (Al) foil is mainly used for the gas barrier layer 2351. Aluminum may secure the mechanical strength of a predetermined level or more, but be light in weight. Thus, aluminum may secure complement for electrochemical properties of the electrode assembly 10 and the electrolyte and heat dissipation. However, the present invention is not limited thereto. For example, the gas barrier layer 1351 may be made of various materials. For example, the gas barrier layer 1351 may be made of one material or a mixture of two or more materials selected from the group consisting of Fe, C, Cr, Mn, Ni and Al. Here, when the gas barrier layer 1351 is made of a material containing iron, the mechanical strength may be improved. When the gas barrier layer 1351 is made of a material containing aluminum, flexibility may be improved. Thus, the material forming the gas barrier layer 1351 may be used in consideration of the characteristics of the gas barrier layer 1351.

The surface protection layer 1352 is made of a polymer and disposed at the outermost layer to protect the secondary battery 1 against external friction and collision and also electrically insulates the electrode assembly 10 from the outside. Here, the outermost layer represents a direction opposite to a direction in which the electrode assembly 10 is disposed with respect to the gas barrier layer 1351, i.e., in an outward direction. The surface protection layer 1352 may be made of at least one or more materials selected from the group consisting of polyethylene, polypropylene, polycarbonate, polyethylene terephthalate, polyvinyl chloride, acrylic polymer, polyacrylonitrile, polyimide, polyamide, cellulose, aramid, nylon, polyester, polyparaphenylene benzobisoxazole, polyarylate, teflon, and glass fiber. Particularly, a polymer such as a nylon resin or polyethylene terephthalate (PET) having mainly abrasion resistance and heat resistance is used. Also, the surface protection layer 1352 may have a single layer structure made of one material or a composite layer structure in which two or more materials are respectively formed as layers.

The sealant layer 1353 is made of a polymer and disposed at the innermost layer to directly contact the electrode assembly 10. The pouch type battery case 13 may be manufactured while a portion thereof is stretched to form the cup part 133 having the accommodation space 1331 having a bag shape when the pouch film 135 having the lamination structure as described above is drawn by using a punch or the like. Also, when the electrode assembly 10 is accommodated in the accommodation space 1331, the electrolyte is injected. Thereafter, when the upper pouch 131 and the lower pouch 132 may contact each other, and thermal compression is applied to the sealing part 134, the sealant layers 1353 may be bonded to each other to seal the battery case 13. Here, since the sealant layer 1353 directly contacts the electrode assembly 10, the sealant layer 1353 may have to have insulating properties. Also, since the sealant layer 1353 contacts the electrolyte, the sealant layer 1353 may have to have corrosion resistance. Also, since the inside of the battery case 13 is completely sealed to prevent materials from moving between the inside and outside of the battery case 13, high sealability has to be realized. That is, the sealing part 134 in which the sealant layers 1353 are bonded to each other should have superior bonding strength. In general, the sealant layer 1353 may be made of at least one or more materials selected from the group consisting of polyethylene, polypropylene, polycarbonate, polyethylene terephthalate, polyvinyl chloride, acrylic polymer, polyacrylonitrile, polyimide, polyamide, cellulose, aramid, nylon, polyester, polyparaphenylene benzobisoxazole, polyarylate, teflon, and glass fiber. Particularly, a polyolefin-based resin such as polypropylene (PP) or polyethylene (PE) may be used for the sealant layer 1353. Polypropylene (PP) is excellent in mechanical properties such as tensile strength, rigidity, surface hardness, abrasion resistance, and heat resistance and chemical properties such as corrosion resistance and thus is mainly used for manufacturing the sealant layer 1353. Furthermore, the sealant layer 1353 may be made of a casted polypropylene or a polypropylene-butylene-ethylene terpolymer. Also, the sealant layer 1353 may have a single layer structure made of one material or a composite layer structure in which two or more materials are respectively formed as layers.

Figure 4:
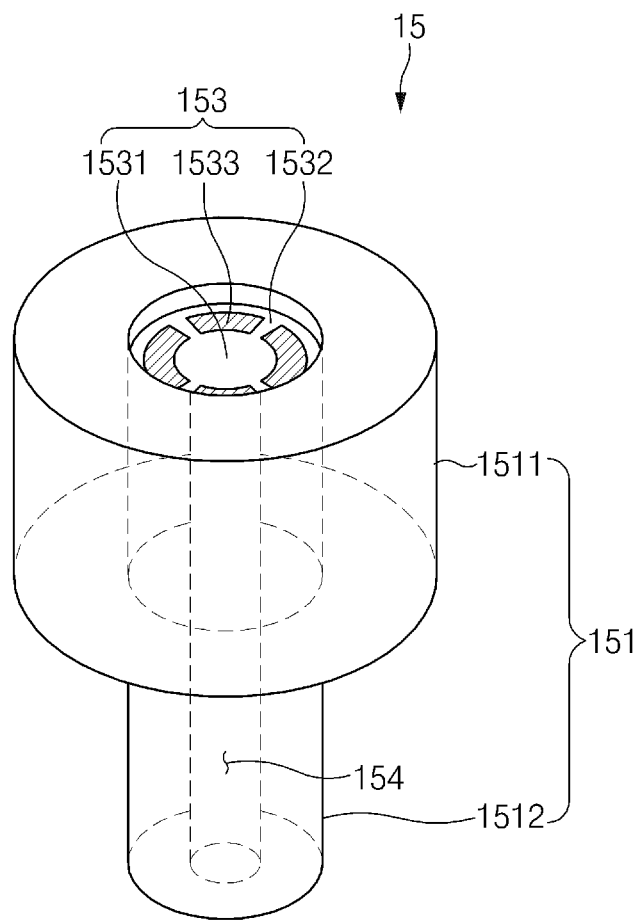
FIG. 4 is a perspective view of a venting device according to an embodiment of the present invention.

FIG. 4 is a perspective view of the venting device 15 according to an embodiment of the present invention.

As described above, the secondary battery 1 according to an embodiment of the present invention further includes at least one venting device 15. At least one venting device 15 is inserted into the sealing part 134 of the pouch of the secondary battery 1 to discharge the internal gas when the internal pressure of the pouch increase, thereby adjusting the pressure. For this, the venting device 15 may include: a housing 151 inserted between both surfaces of the sealing part 134 so as to be sealed together with the sealing part 134; a sheet 152 which is made of a metal and formed in the housing 151 and through which a passage 154 allowing the inside and the outside of the pouch to communicate with each other passes; and a ball 155 contacting or spaced apart from the sheet 152 at a side of an outlet 1541 (hereinafter, referred to as an outlet-side) of the passage 154 to open and close the passage 154. The sheet 152 includes: a surface treatment layer formed on chamfered or filleted one surface 1521 to face the ball 155 after an edge of an inner circumference of a surface of the outlet-side of the passage 154 is chamfered or filleted; and a polymer layer 1523 made of a polymer and thermally fused to the surface treatment layer 1522.

The housing 151 may be inserted between both the surfaces of the sealing part 134 so as to be sealed together with the sealing part 134. When the housing 151 is inserted between both the surfaces of the sealing part 134, a sealant layer 1353 that is the innermost layer of the sealing part 134 contacts the housing 151. Also, when heat and a pressure are applied, while the sealant layer 1353 of the sealing part 134 is sealed, the housing 151 is fused to be sealed together. As illustrated in FIG. 4, the housing 151 may include an upper housing 1511 and a lower housing 1512, and a stepped portion may be formed between the upper housing 1511 and the lower housing 1512. The stepped portion may be formed because the upper housing 1511 and the lower housing 1512 have shapes or sizes different from each other. For example, the upper housing 1511 may have a transverse cross-section having a circular cylinder shape, and the lower housing 1512 may have a transverse cross-section having an oval cylinder shape. Alternatively, the lower housing 1512 may have a width less than that of the upper housing 1511. Thus, the lower housing 1512 may be inserted between both the surfaces of the sealing part 134 so as to be sealed together with the sealing part 134. Thus, the lower housing 1512 may be fused to the inner surface of the sealing part 134, and the upper housing 1511 may protrude to the outside of the pouch. Here, if the lower housing 1512 has an excessively large width, the sealing part 134 has to be deformed in size. Thus, the sealing of the sealing part 134 may be damaged. Thus, the lower housing 1512 may have a width less than a thickness of the sealing part 134. Particularly, it is preferable that a long axis of the transverse cross-section of the lower housing 1512 has a width that is at least 6 mm less than the thickness of the sealing part 134. Also, if the upper housing 1511 has an excessively large size, the upper housing 1511 protruding to the outside of the pouch may interfere with other secondary batteries 1 that are disposed in the vicinity of the upper housing 1511. Thus, it may be difficult to assemble a package or module of the secondary battery 1. Thus, the upper housing 1511 may have a width less than a thickness of the sealing part 134. Particularly, it is preferable that the transverse cross-section of the upper housing 1511 has a diameter that is at least 8 mm less than the thickness of the sealing part 134. However, the present invention is not limited thereto. For example, the upper housing 1511 and the lower housing 1512 may have various shapes, for example, one cylinder shape without being distinguished from each other.

The sheet 152 may be formed in the housing 151 and made of a metal. Also, the passage 154 through which the inside and the outside of the pouch communicate with each other may be formed to pass through a center of the sheet 152. The sheet 152 will be described below in detail.

The plate spring 153 may be made of a metal to open and close the passage 154 formed in the sheet 152 according to an internal pressure of the pouch. Particularly, when the internal pressure of the pouch is less than a specific pressure, the plate spring 153 may contact the sheet 152 to close the outlet 1541 of the passage 154. Also, when the internal pressure of the pouch gradually increase to exceed the specific pressure, the plate spring 153 may be spaced apart from the sheet 152 to open the outlet 1541 of the passage 154.

According to the related art, the passage 154 is closed by using a coil spring. However, the venting device has to be miniaturized so as to be inserted into the sealing part 134 of the secondary battery 1. However, if the coil spring is used like the related art, the venting device may be complicated in structure and limited in miniaturization. Thus, according to an embodiment of the present invention, the plate spring 153 may be used to simplify the structure of the venting device and miniaturize the venting device so as to be inserted into the sealing part 134 of the secondary battery 1.

The ball 155 may have a spherical shape and be disposed at the outlet-side of the passage 154. Also, the ball 155 may be disposed between the plate spring 153 and the sheet 152 so as to contact or be spaced apart from the sheet 152, thereby closing or opening the passage 154. Particularly, the ball 155 receives elastic force from a central portion 1531 of one side 1530 of the plate spring 153 toward the sheet 152 so as to be closely attached to the sheet 152, thereby closing the passage 154. Here, according to an embodiment of the present invention, surface treatment may be performed on one surface 1521 of the sheet 152 to form a surface treatment layer 1522. Then, a polymer film may be fused, and a polymer layer 1523 is laminated. Thus, the ball 155 may be closely attached to the polymer layer 1523 to prevent a gap from occurring, thereby preventing sealability from being deteriorated. The ball 155 may be made of a polymer to more improve adhesion with respect to the sheet 152, but may be deteriorated in durability. Thus, in order to improve the durability of the ball 155, it may be preferable that the ball 155 is made of a metal.

Figure 5:
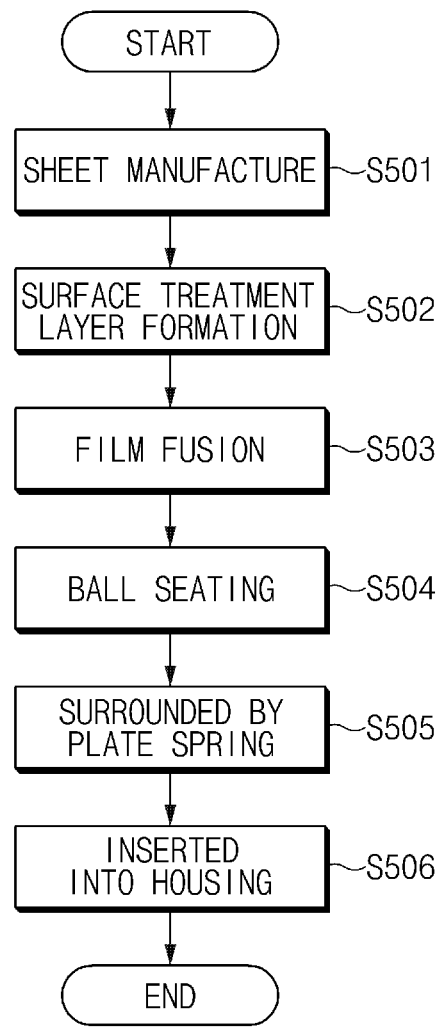
FIG. 5 is a flowchart illustrating a method for manufacturing the venting device according to an embodiment of the present invention.

FIG. 5 is a flowchart illustrating a method for manufacturing the venting device 15 according to an embodiment of the present invention.

According to an embodiment of the present invention, even though all the ball 155 and the sheet 152 are made of the metal, the adhesion between the ball 155 and the sheet 152 may be improved to improve the sealability when the passage 154 is closed. For this, a method for manufacturing the venting device 15 according to an embodiment of the present invention includes: a step (S501) of manufacturing a sheet 152 which is made of a metal, through which a passage 154 passes and in which an edge of an inner circumference of a surface of an outlet-side of the passage 154 is chamfered or filleted; a step (S502) of forming a surface treatment layer 1522 on the chamfered or filleted one surface 1521 of the sheet 152; a step (S503) of fusing a film made of a polymer on the surface treatment layer 1522; and a step (S504) of seating a spherical ball 155 on the fused film. Thereafter, the method for manufacturing the venting device 15 may further include: a step (S505) of allowing a plate spring 153 to surround the sheet 152 and the ball 155; and a step (S506) of inserting the sheet 152 and the plate spring 153 into a housing 151 that is inserted between both surfaces of a sealing part 134 so as to be sealed together with the sealing part 134.

Hereinafter, each of the steps illustrated in the flowchart of FIG. 5 will be described with reference to FIGS. 6 to 14.

Figure 6:
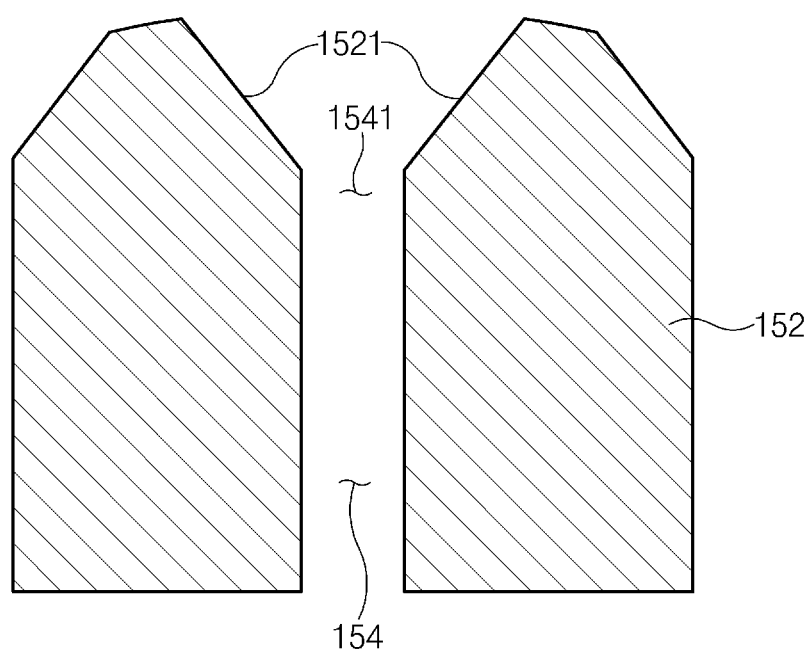
FIG. 6 is a schematic view of a sheet according to an embodiment of the present invention.

FIG. 6 is a schematic view of the sheet 152 according to an embodiment of the present invention.

As described above, the sheet 152 is formed in the housing 151 and made of a metal. Also, as illustrated in FIG. 6, in the sheet 152, the edge of the inner circumference of the surface of the outlet-side of the passage 154 is chamfered or filleted. Thus, the ball 155 may be easily closely attached to the chamfered or filleted surface 1521 of the sheet 152. According to an embodiment of the present invention, the surface treatment layer 1522 is formed on the chamfered or filleted surface 1521 of the sheet 152, and then, the polymer film is fused. Thus, the ball 155 closely attached to the sheet 152 may be improved in adhesion to improve sealability when the passage 154 is closed.

Figure 7:
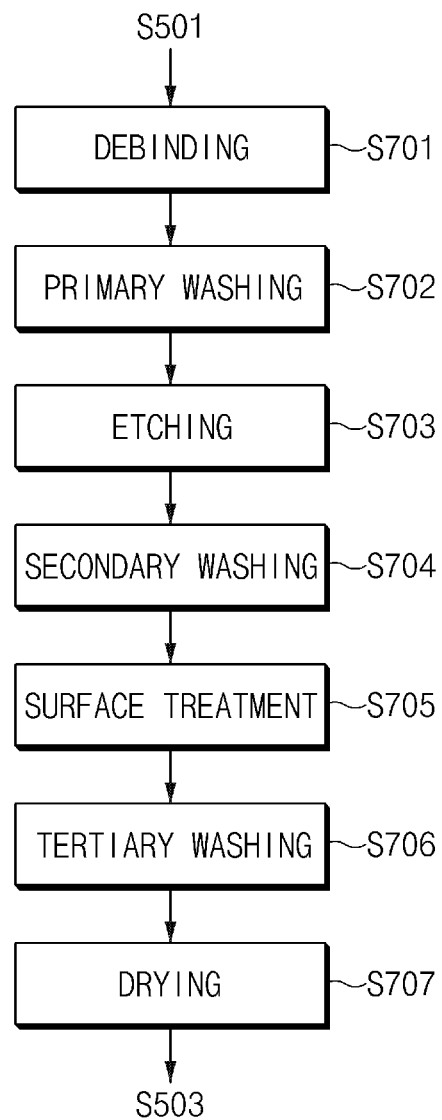
FIG. 7 is a flowchart illustrating a method for forming a surface treatment layer on one surface of the sheet according to an embodiment of the present invention.

FIG. 7 is a flowchart illustrating a method for forming the surface treatment layer 1522 on the one surface 1521 of the sheet 152 according to an embodiment of the present invention.

As illustrated in FIG. 6, the sheet 152 has a cylinder shape through which the passage 154 passes. Also, if the sheet 152 is made of a polymer, durability may be deteriorated to reduce a lifespan of the venting device 15. Thus, the sheet 152 according to an embodiment of the present invention is made of a metal (S501). Particularly, the metal may include aluminum (Al) or stainless steel (STS). In the sheet 152, the edge of the inner circumference of the surface of the outlet-side of the passage 154 may be chamfered or filleted. Here, although the passage 154 and the edge of the inner circumference are cut after the sheet 152 is manufactured first in the cylinder shape, the sheet 152 may be manufactured through various methods without being limited, for example, a melted metal may be injected into a casting mold in which the passage 154 and the edge of the inner circumference are filled to manufacture the sheet 152.

The surface treatment layer 1522 is formed on the chamfered or filleted one surface 1521 of the sheet 152 (S502). According to an embodiment of the present invention, in order to form the surface treatment layer 1522, a step (S701) of debinding the one surface 1521 of the sheet 152; a primary washing step (S702); an etching step (S703); a secondary washing step (S704); a surface treatment step (S705); a tertiary washing step (S706); and a drying step (S707) are performed.

Hereinafter, each of the steps illustrated in the flowchart of FIG. 7 will be described with reference to FIG. 8.

Figure 8:
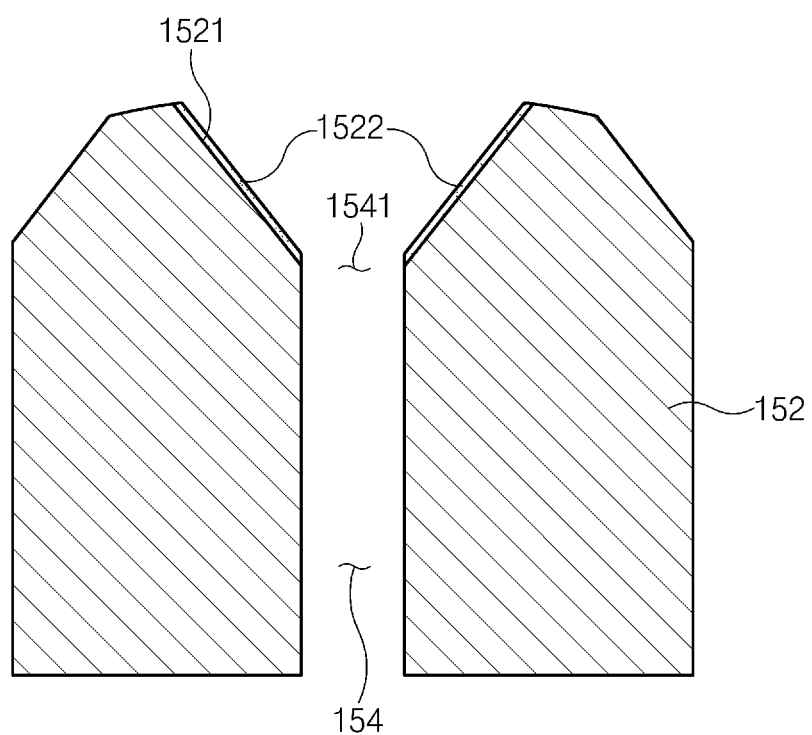
FIG. 8 is a schematic view illustrating a state in which the surface treatment layer is formed on the one surface of the sheet according to an embodiment of the present invention.

FIG. 8 is a schematic view illustrating a state in which the surface treatment layer 1522 is formed on the one surface 1521 of the sheet 152 according to an embodiment of the present invention.

In order to form the surface treatment layer 1522, the one surface 1521 of the sheet 152 is debound (S701). Various metal processing processes may be performed to manufacture the sheet 152. Here, in order to reduce friction between the sheet 152 and a metal processing device, a lubricant is applied to the one surface 1521 of the sheet 152. Thus, when the sheet 152 is completely manufactured, the lubricant, dusts, or other impurities may exist on the one surface 1521 of the sheet 152. The debinding process is performed to remove the lubricant, the dusts, or other impurities so that the sheet 152 is more efficiently surface-treated.

After the debinding process, the primary washing step (S702) is performed to wash a solution used for the debinding. Here, the washing refers to a water cleaning or washing process. In order to prevent other impurities dissolved in water from being attached during the washing, it is preferable that distilled water in which the impurities are not dissolved is used as the water.

When the metal is left in air, the metal may be oxidized somewhat to produce an oxidizing material. Particularly, if the sheet 152 is made of aluminum, a film made of aluminum oxide may be formed on the one surface 1521 of the sheet 152. Thus, the etching (S703) is performed to remove the oxidized material produced on the one surface 1521 of the sheet 152.

After the etching process, the secondary washing (S704) is performed to wash the solution used for the etching. Also, the surface treatment (S705) is performed on the one surface 1521 of the sheet 152. The surface treatment is a process of chemically treating a surface of the metal such as aluminum to improve corrosion resistance or abrasion resistance of the metal, i.e., to change a physical property. The surface treatment includes anodizing, chemical film processing, electroplating, and the like.

Here, according to an embodiment of the present invention, the surface treatment may be chromate treatment using chromium. The chromate treatment is a kind of chemical film processing in which an insoluble chromate (chromates) film containing a chromium component is thinly formed on the surface of the metal. For this, the sheet 152 is immersed in an aqueous solution containing chromium ions. As a result, the chromium ions undergo oxidation reaction, and the insoluble chromium oxide is generated on the one surface 1521 of the sheet 152 to form a chromate film. That is, the surface treatment layer 1522 may be the chromate film containing chromium. Here, the chromium ions may be various types of ions without limitation such as hexavalent or trivalent ions. Also, the various non-limiting materials such as chromic anhydride, chromium nitrate, chromium sulfate, chromium acetate, and chromium chloride may be used as the aqueous solution containing chromium ions.

The surface treatment according to another embodiment of the present invention may be non-chromate treatment using a material other than chromium. Here, the material other than chromium may be, for example, zirconium. If zirconia treatment using zirconium is performed, the sheet 152 is immersed in an aqueous solution containing the zirconium ions. As a result, the zirconium ions undergo oxidation reaction, and zirconium oxide is generated on the one surface 1521 of the sheet 152 to form a zirconia film. The non-chromate treatment is not limited thereto and may include titanium treatment using titanium. That is, according to another embodiment of the present invention, the surface treatment layer 1522 may be the zirconia film containing zirconium or the titanium film containing titanium.

After the surface treatment (S705), the tertiary washing step (S706) is performed to wash the solution used for the surface treatment. Also, since the sheet 152 is dried (S707), the surface treatment layer 1522 is formed on the one surface 1521 of the sheet 152 as illustrated in FIG. 8. As described above, the surface treatment layer 1522 may be formed on the one surface 1521 of the sheet 152 to secure the corrosion resistance and also secure fusibility that the polymer material is well fused to the surface.

Figure 9:
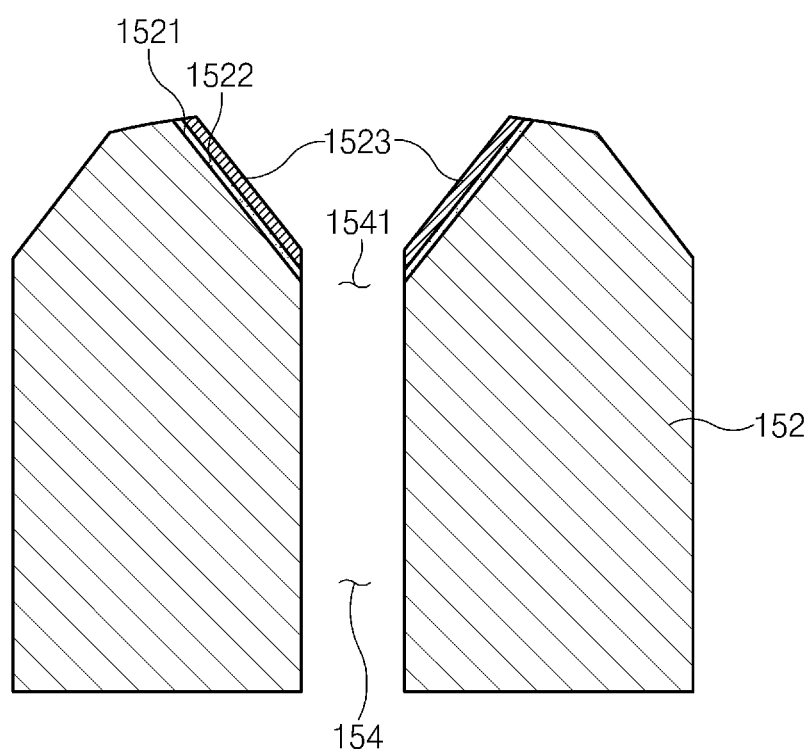
FIG. 9 is a schematic view illustrating a state in which a polymer layer is laminated on the surface treatment layer according to an embodiment of the present invention.

FIG. 9 is a schematic view illustrating a state in which the polymer layer 1523 is laminated on the surface treatment 1522 layer according to an embodiment of the present invention.

As described above, if the ball 155 or the sheet 152 is made of the polymer, the durability may be deteriorated. If all the ball 155 and the sheet 152 are made of the metal, the gap may occur between the ball 155 and the sheet 152 to deteriorate the sealability. If the polymer film adheres by using an adhesive without performing the surface treatment on the one surface 1521 of the sheet 152, the one surface 1521 of the sheet 152 may increase in thickness by the adhesive. In addition, if the adhesive performance of the adhesive is deteriorated as the venting device 15 is aged as time elapses, the polymer film may be delaminated. Thus, according to an embodiment of the present invention, the surface treatment is performed on the one surface 1521 of the sheet 152 to form the surface treatment layer 1522, and the polymer film is fused to the surface treatment layer 1522 to laminate the polymer layer 1523 (S503).

Here, since the polymer film has a thin and wide film shape, and the edge of the inner circumference of the one surface 1521 of the sheet 152 is chamfered or filleted, it is difficult to seat the polymer film on the one surface 1521 of the sheet 152. A sealing tool for fusing the polymer film has one end that protrudes in a shape corresponding to the one surface 1521 of the sheet 152. Thus, the polymer film is finely cut and seated on the one end of the sealing tool. Then, the one end of the sealing tool contacts the one surface 1521 of the sheet 152. As a result, the polymer film may be easily seated. Also, as illustrated in FIG. 9, when heat and a pressure are applied through the sealing tool, the polymer film may be fused to laminate the polymer layer 1523 on the surface treatment layer 1522.

According to an embodiment of the present invention, before the polymer film is fused, the polymer film temporarily adheres to the surface treatment layer 1522 formed on the one surface 1521 of the sheet 152. That is, the polymer film is temporarily attached to the surface treatment layer 1522. Thus, even though the sheet 152 moves along a process line, the polymer film may not move from the sheet 152. The temporarily adhering process of the polymer film is performed by applying a pressure of 0.1 MPa to 0.3 MPa for 0.4 seconds to 0.8 seconds under a temperature of 110° C. to 130° C. Since the temporary adhesion is a process of temporarily attaching the polymer film, the polymer film has to be easily detached for performing the fusion process later. Thus, if the temporary adhesion is performed under a temperature of 130° C. or more, the polymer film may be more strongly attached. Also, if the temporary adhesion is performed under a temperature of 110° C. or less, the polymer film may not be properly attached.

Also, since the polymer film is fused by applying the heat and pressure for a predetermined time, the polymer layer 1523 may be laminated on the surface treatment layer 1522 of the sheet 152. The fusion process may be performed under a temperature of 140° C. to 220° C. In general, if the temperature is less than 140° C., the polymer film, particularly, the film containing polypropylene may not be sufficiently melted to deteriorate fusibility. Also, if the temperature is greater than 220° C., the polymer film may be excessively melted to be significantly deformed.

Also, the process of fusing the polymer film may be performed only once, but also may be repeated a plurality of times. If it is repeated three times, the one-time fusion is to remove air bubbles between the surface treatment layer 1522 of the sheet 152 and the polymer film. Here, the process of fusing the polymer film may be performed by applying a pressure of 0.1 MPa to 0.3 MPa for 2 seconds to 4 seconds under a temperature of 150° C. to 170° C., preferably, 155° C. to 165° C. Since the one-time fusion is an initial fusion, it is preferably performed at a temperature of at least 10° C. or more than 140° C., i.e., at least 150° C., to improve the fusibility. Also, if the fusion temperature is excessively high in the state in which the polymer film temporarily adheres to the surface treatment layer 1522 of the sheet 152, it is difficult to correct the fused position of the polymer film when the polymer film is fused at a wrong position. Thus, it is preferable that the temperature is less than 170° C. The two-time fusion is to secure the sealability between the one surface 1521 of the sheet 152 and the polymer film. Here, the process of fusing the polymer film may be performed by applying a pressure of 0.1 MPa to 0.3 MPa for 2 seconds to 4 seconds under a temperature of 140° C. to 170° C., preferably, 145° C. to 155° C. Since the two-time fusion is merely to secure the sealability, the two-time fusion may be performed again at a temperature similar to that of the one-time fusion. Here, since the two-time fusion is not the initial fusion, the two-time fusion may be performed at a temperature of 140° C. that is the lowest temperature, or more. Also, the last three-time fusion is to enhance the fusibility of the polymer film. Here, the process of fusing the polymer film may be performed by applying a pressure of 0.1 MPa to 0.3 MPa for 2 seconds to 4 seconds under a temperature of 210° C. to 220° C., preferably, 215° C. to 220° C. That is, it is preferable that the last three-time fusion is performed at the highest temperature. However, as described above, if the temperature is higher than 220° C., the polymer film may be excessively melted and thus significantly deformed. Also, if the temperature is less than 210° C., the fusibility may not be more enhanced when compared to the fusibility after the two-time fusion is performed.

It is preferable that the polymer film has a thickness of 100 μm and includes a polyolefin-based polymer. Particularly, in order to improve the adhesion with respect to the sheet 152, the polymer film may include the acid-treated polyolefin-based polymer. For example, the acid-treated polypropylene may be mixed with normal polypropylene, or acid-treated polyethylene may be mixed with the normal polypropylene. Alternatively, the polymer film may be simply made of only acid-treated polypropylene. Here, the acid-treated polypropylene may be maleic anhydride polypropylene (MAH PP).

Figure 10:
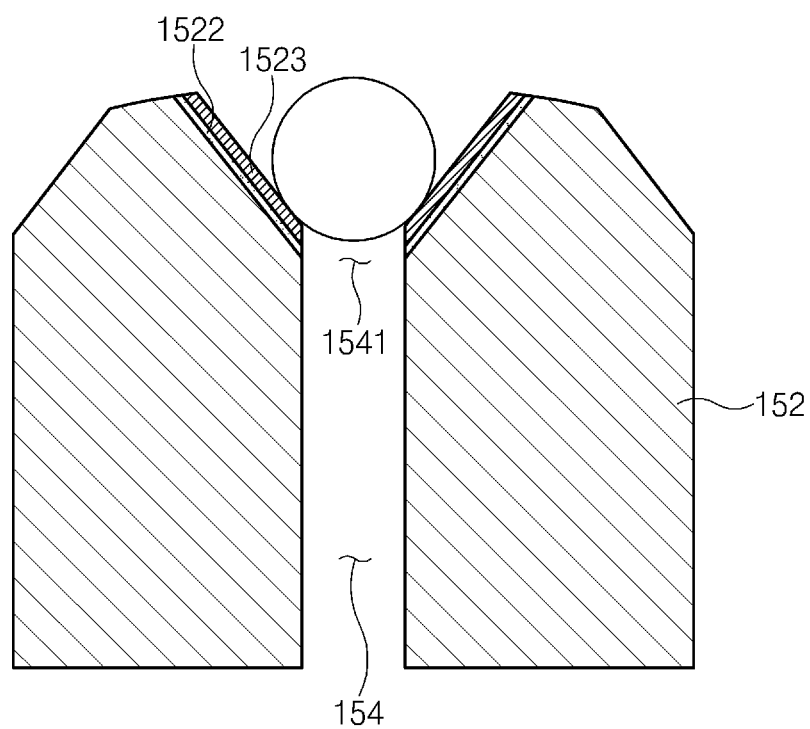
FIG. 10 is a schematic view illustrating a state in which a ball is seated on the polymer layer according to an embodiment of the present invention.

FIG. 10 is a schematic view illustrating a state in which the ball 155 is seated on the polymer layer 1523 according to an embodiment of the present invention.

The ball 155 made of a metal is seated on an upper portion of the polymer layer 1523 laminated on the one surface 1521 of the sheet 152 as illustrated in FIG. 10. Since the edge of the inner circumference of the one surface 1521 of the sheet 152 is chamfered or filleted, the sheet 152 has predetermined slope. Also, since the polymer layer 1523 is laminated on the one surface 1521 of the sheet 152, when the ball 155 is seated, the adhesion between the ball 155 and the sheet 152 may be improved. The ball 155 has a diameter less than the widest width of the one surface 1521 of the sheet 152 and larger than the narrowest width of the one surface 1521 of the sheet 152 so that the ball 155 is easily seated on the sheet 152. Also, when the ball 155 is seated, the highest point of the ball 155 is higher than the highest point of the sheet 152. Thus, the ball 155 and the plate spring 153 may easily contact each other, and elastic force of the plate spring 153 may be efficiently applied to the ball 155 so that the ball 155 is closely attached to the sheet 152.

As described above, in order to improve the durability, it is preferable that all the sheet 152 and the ball 155 are made of the metal. However, since the metal is not flexible, if the metals contact each other, a gap may occur between the ball 155 and the sheet 152 to deteriorate the sealability. However, according to an embodiment of the present invention, since the polymer layer 1523 is laminated on the one surface 1521 of the sheet 152, the ball 155 is closely attached to the polymer layer 1523 to prevent the gap from occurring, thereby preventing the sealability from being deteriorated.

Figure 11:
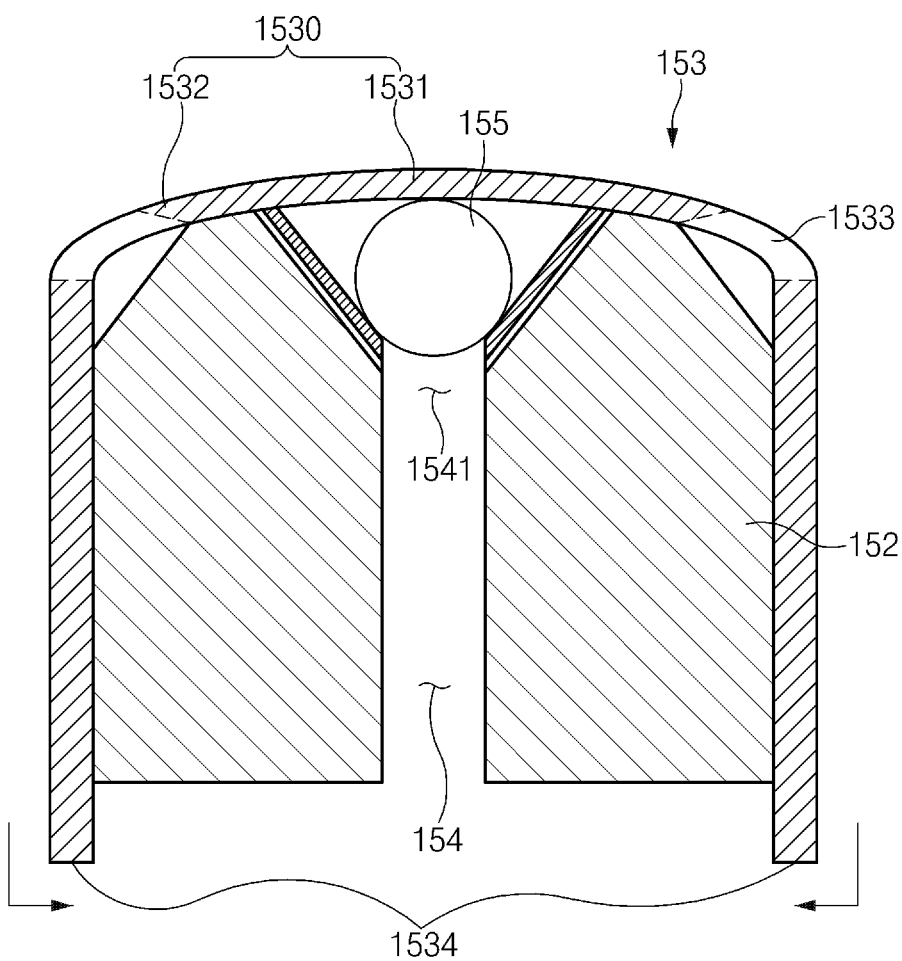
FIG. 11 is a schematic view illustrating a state in which a plate spring surrounds the sheet and the ball according to an embodiment of the present invention.

FIG. 11 is a schematic view illustrating a state in which the plate spring 153 surrounds the sheet 152 and the ball 155 according to an embodiment of the present invention.

The plate spring 153 is formed to surround the ball 155 and the sheet 152 and has elasticity to open and close the passage 154 together with the ball 155 according to the internal pressure of the pouch. After the ball 155 is seated on the polymer layer 1523 of the sheet 152, a metal plate is formed to manufacture the plate spring 153. The metal plate has a wide and thin plate shape and is made of a metal. Particularly, the metal plate may include aluminum (Al) or stainless steel (STS). A drawing process of elongating the metal plate by using a punch may be performed to manufacture the plate spring 153. Particularly, the metal plate may be seated on a die, and a stripper may fix the metal plate. Then, the metal plate may be elongated through the punch to perform the drawing. As illustrated in FIG. 11, in the plate spring 153 manufactured as described above, one side 1530 that is the uppermost end has a cap shape that is convex outward, and an insertion space into which the sheet 152 is inserted is formed therein. The one side 1530 of the plate spring 153 may mean a ceiling of the cap shape as illustrated in FIG. 11. However, the present invention is not limited thereto. For example, the one side 1530 of the plate spring 153 may include various portions.

The plate spring 153 opens and closes the passage 154 formed in the sheet 152 according to the internal pressure of the pouch. For this, it is preferable that a gas exhaust hole 1533 is punched in the one side 1530 of the plate spring 153. Here, the one side 1530 of the plate spring 153 includes a central portion 1531 formed in a center thereof and a peripheral portion 1532 extending outward from the central portion 1531. Also, a bottom surface of the central portion 1531 of the one side 1530 contacts the ball 155 to close the passage 154 formed in the sheet 152, and thus, the gas exhaust hole 1533 is not punched in the central portion 1531. Thus, it is preferable that the gas exhaust hole 1533 is punched in the peripheral portion 1532 of the one side 1530 of the plate spring 153.

When the plate spring 153 is manufactured, as illustrated in FIG. 11, the sheet 152 and the ball 155 are inserted into the insertion space. As a result, the plate spring 153 surrounds the periphery of the sheet 152 and the ball 155. When the sheet 152 and the ball 155 are inserted into the insertion space, it is preferable that the outlet-side of the passage 154 faces the one side 1530 of the plate spring 153. Thus, when the internal pressure of the pouch is less than a specific pressure, the one side 1530 of the plate spring 153 pushes the ball 155 inward from the outlet-side of the passage 154 formed in the sheet 152 to close the passage 154.

As described above, the gas exhaust hole 1533 may be formed in the peripheral portion 1532 of the one side 1530 of the plate spring 153. Thus, when the internal gas of the pouch pushes the one side 1530 of the plate spring 153 outward, the passage 154 is opened so that the gas leaks to the outlet 1541 of the passage 154. Here, the leaking gas has to be discharged to the outside through the gas exhaust hole 1533. Thus, in the sheet 152, the edge of the outer circumference of the outlet-side of the passage 154 may be chamfered or filleted. As a result, the gas may be guided to the gas exhaust hole 1533. Also, when the one side 1530 of the plate spring 153 is pushed outward, a space to which the peripheral portion 1532 of the one side 1530 of the plate spring 153 moves inward, is provided.

Figure 12:
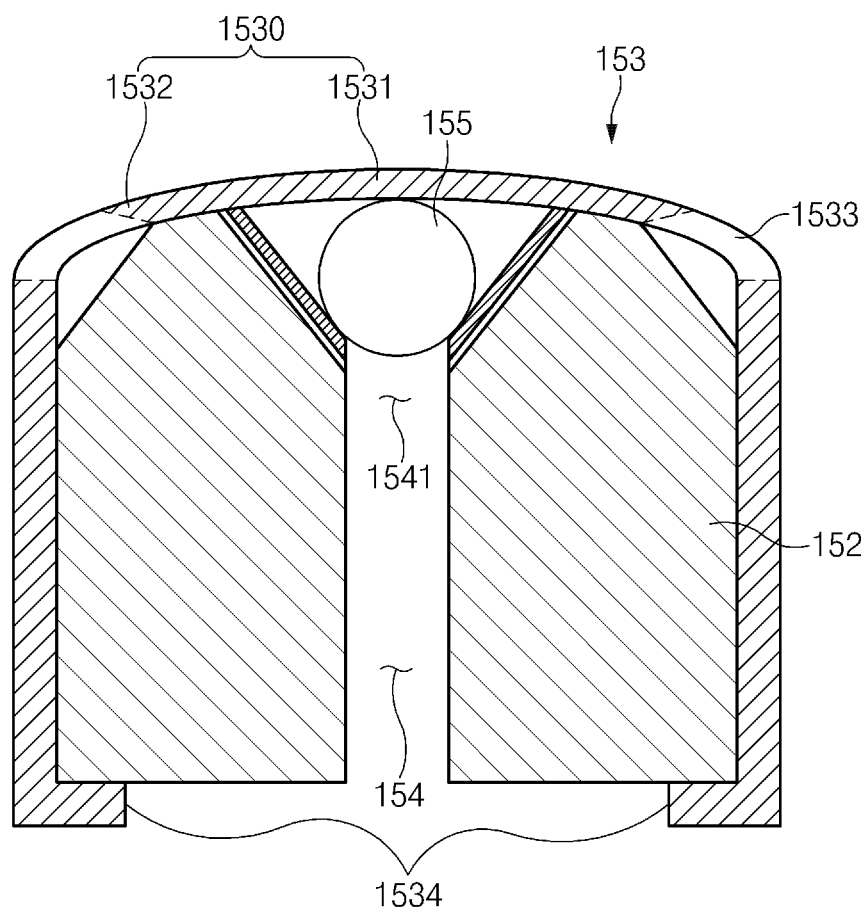
FIG. 12 is a schematic view illustrating a state in which an end of the other side of the plate spring is bent toward the sheet according to an embodiment of the present invention.

FIG. 12 is a schematic view illustrating a state in which an end of the other side 1534 of the plate spring 153 is bent toward the sheet 152 according to an embodiment of the present invention.

It is preferable that the plate spring 153 is firmly fixed to the sheet 152. Thus, when the internal gas of the pouch pushes the one side 1530 of the plate spring 153 outward through the ball 155, the one side 1530 of the plate spring 153 moves outward. Here, the plate spring 153 is not entirely slid, but only one side 1530 of the plate spring 153 is deformed to move. If the plate spring 153 is slid, the plate spring 153 may be separated from the venting device 15.

Particularly, only the central portion 1531 of the one side 1530 may be pushed outward, and the peripheral portion 1532 of the one side 1530 may move inward. Thus, the internal gas of the pouch may be discharged to the outside through the passage 154.

According to an embodiment of the present invention, after the sheet 152 and the ball 155 are inserted into the insertion space, the end 1534 of the other side of the plate spring 153 is bent toward the sheet 152 as illustrated in FIG. 10. As a result, even though the internal gas of the pouch pushes the one side 1530 of the plate spring 153 outward, the detachment (separation) of the plate spring 153 from the sheet 152 may be prevented to fix the plate spring 153 to the venting device 15 without separating the plate spring 153 from the venting device 15.

Figure 13:
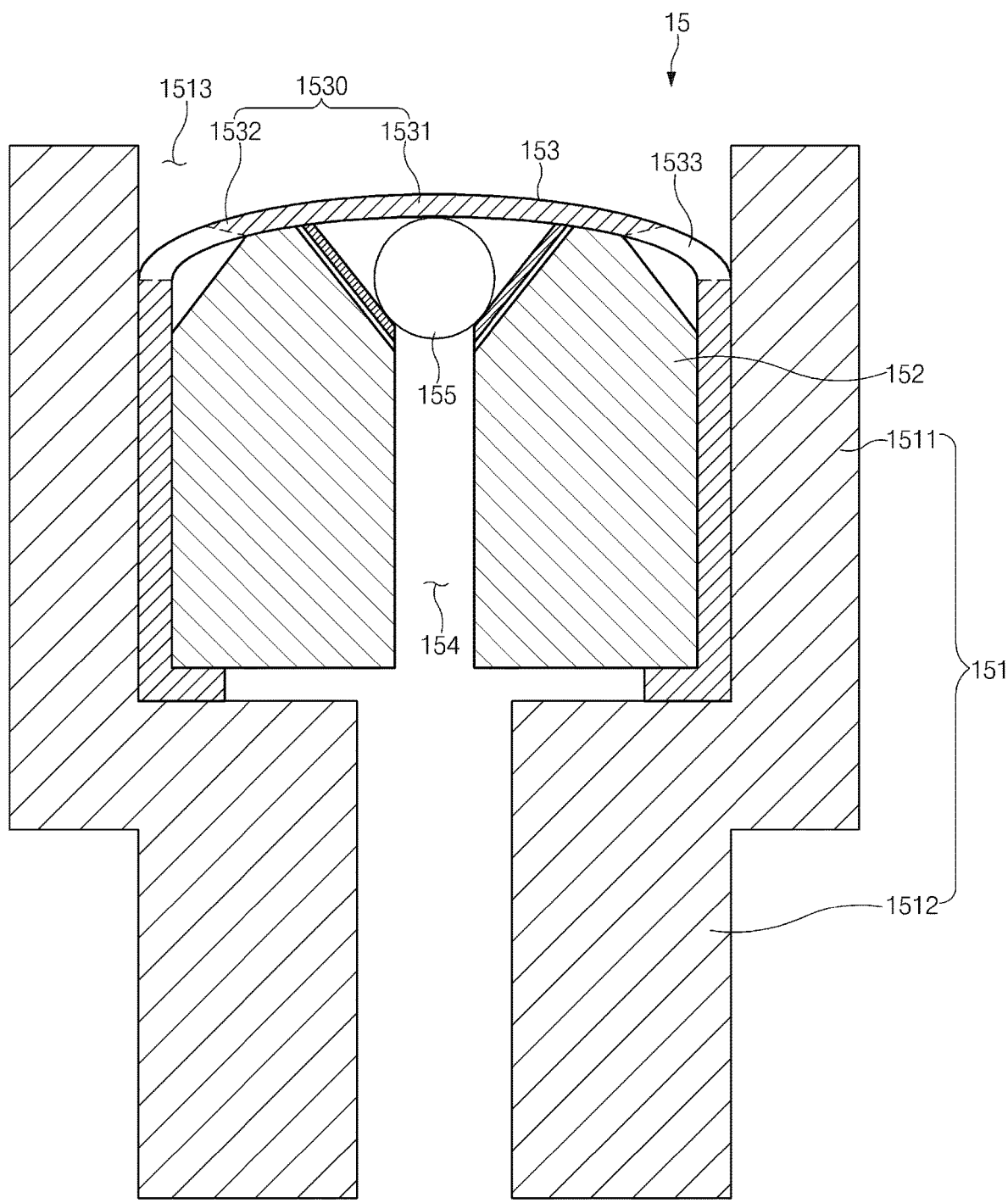
FIG. 13 is a schematic view illustrating a venting device manufactured by the plate spring and the sheet into a housing according to an embodiment of the present invention.
Figure 14:
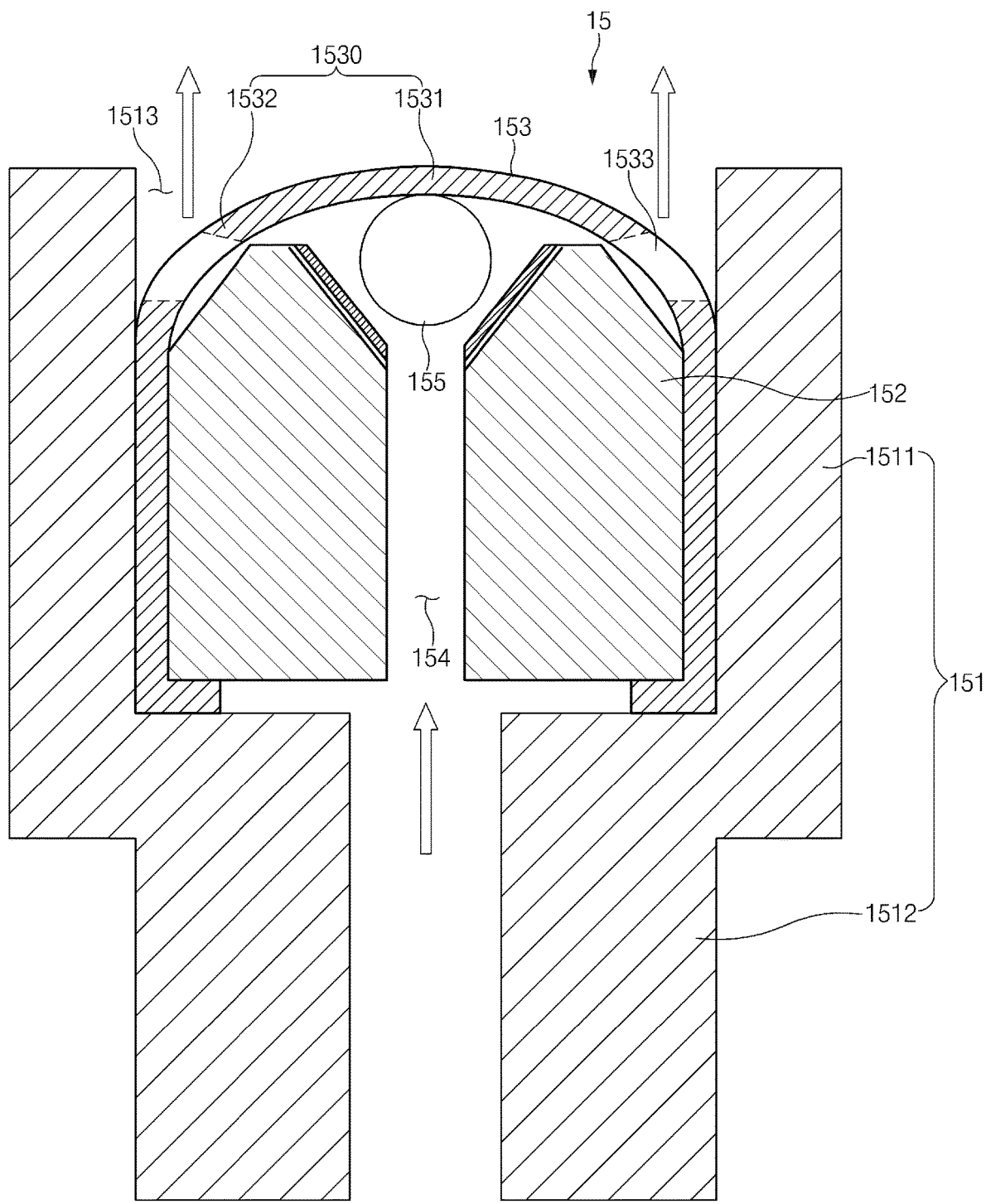
FIG. 14 is an operation diagram illustrating an operation of the venting device according to an embodiment of the present invention.

FIG. 13 is a schematic view illustrating the venting device 15 manufactured by inserting the plate spring 153 and the sheet 152 in FIG. 11 into the housing 151 according to an embodiment of the present invention, and FIG. 14 is an operation diagram illustrating an operation of the venting device 15 according to an embodiment of the present invention.

The plate spring 153 into which the sheet 152 is inserted is inserted into the housing 151 as illustrated in FIG. 13. As a result, the venting device 15 according to an embodiment of the present invention may be completely manufactured. Here, if the housing 151 includes the upper housing 1511 and the lower housing 1512, it is preferable that the plate spring 153 and the sheet 152 are included in the upper housing 1511. Also, as illustrated in FIG. 13, it is preferable that the one side 1530 of the plate spring 153 faces an opening end of the upper housing 1511. Thus, the gas may be discharged to the outside through the gas exhaust hole 1533 formed in the one side 1530. Also, as described above, the plate spring 153 is not slid as a whole, but only one side 1530 is deformed in the fixed state. Thus, it is preferable that a gap between the plate spring 153 and the housing 151 is minimized when the plate spring 153 is inserted into the housing 151 so that frictional force acts largely between an outer circumferential surface of the plate spring 153 and an inner circumferential surface of the housing 151. However, the present invention is not limited thereto. In order that the frictional force further increases, surface roughness of the outer circumferential surface of the plate spring 153 or the inner circumferential surface of the housing 151 may increase so that a frictional coefficient increases. Furthermore, the plate spring 153 may be fixed to the housing 151 through various methods, for example, a method in which a separate adhesive is applied between the plate spring 153 and the housing 151, or a protrusion protrudes from one of the plate spring 153 and the housing 151, and a groove is formed in the other of the plate spring 153 and the housing 151.

The venting device 15 manufactured as described above is inserted into the sealing part 134 of the pouch so as to be sealed together. Also, when a gas is generated in the pouch so that an internal pressure of the pouch increases, the gas is discharged to the outside. That is, as described above, when the gas is generated in the pouch, and thus an internal pressure of the pouch gradually increases to exceed a specific pressure, the gas pushes the ball 155 outward as illustrated in FIG. 14. Also, since the ball 155 is pushed, the one side 1530 of the plate spring 153 is also pushed outward, and thus, the plate spring 153 opens the outlet 1541 of the passage 154. Here, as described above, it is preferable that the plate spring 153 is not slid with respect to the sheet 152.

When the gas within the pouch is sufficiently discharged to the outside, the internal pressure of the pouch decreases again, and thus, the pressure of the gas pushing the plate spring 153 outward decreases. However, the plate spring 153 is made of the metal and thus has the elasticity. Thus, when the internal pressure of the pouch is less than a specific pressure, the plate spring 153 returns to its original position by the elasticity of the plate spring 153. Also, the ball 155 is pushed inward from the outlet-side of the passage 154 by the elasticity of the plate spring 153. Thus, the ball 155 is closely attached to the polymer layer 1523 formed on the one surface 1521 of the sheet 152 to close the passage 154.

Those with ordinary skill in the technical field of the present invention pertains will be understood that the present invention can be carried out in other specific forms without changing the technical idea or essential features. Therefore, the above-disclosed embodiments are to be considered illustrative and not restrictive. Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. A venting device inserted into a sealing part of a pouch of a secondary battery, the venting device comprising:
   a housing inserted between confronting surfaces of the sealing part and sealed together with the sealing part;
   an element made of a metal and disposed in the housing and through which a passage is defined providing gas communication between an inside and an outside of the pouch; and
   a ball disposed at an outlet-side of the passage, the ball being configured to open and close the passage, the ball having a lower position contacting the element and an upper position spaced apart from the element,
   wherein, in the element, an edge of an inner circumference of a surface of the outlet-side of the passage is chamfered or filleted so as to face the ball, and
   the element comprises:
   a surface treatment layer formed on the chamfered or filleted surface; and
   a contact layer made of a polymer and fused to the surface treatment layer.

2. The venting device of claim 1, further comprising a plate spring surrounding the ball and the element and having elasticity, the plate spring and the ball together being configured to open and close the passage according to an internal pressure of the pouch.

3. The venting device of claim 2, wherein the plate spring has a cap shape that is convex outward and forms an insertion space therein into which the element is inserted.

4. The venting device of claim 3, wherein the plate spring comprises a central portion and a peripheral portion extending outward from the central portion, and
   a gas exhaust hole extends through the peripheral portion of the plate spring.

5. The venting device of claim 3, wherein an end of the plate spring is bent toward the element that is inserted into the insertion space.

6. The venting device of claim 1, wherein the polymer comprises an acid-treated polyolefin-based polymer.

7. The venting device of claim 1, wherein the metal comprises aluminum or stainless steel.

8. The venting device of claim 1, wherein the surface treatment layer comprises at least one of: chromium, zirconium, and titanium.

9. The venting device of claim 1, wherein the housing comprises an upper housing and a lower housing, the upper housing and the lower housing having shapes or sizes different from each other.

10. The venting device of claim 9, wherein the lower housing has a width less than a width of the upper housing, the width of the lower housing and the width of the upper housing being defined in a lateral direction perpendicular to a longitudinal flow direction of the passage defined through the element.

11. The venting device of claim 9, wherein the upper housing has a circular cylinder shape, and
the lower housing has an oval cylinder shape.

12. A method for manufacturing a venting device inserted into a sealing part of a pouch of a secondary battery, the method comprising:
a step of manufacturing an element made of a metal, through which a passage passes is defined, and in which an edge of an inner circumference of a surface of an outlet-side of the passage is chamfered or filleted;
a step of forming a surface treatment layer on the chamfered or filleted surface of the element;
a step of fusing a film made of a polymer to the surface treatment layer; and
a step of seating a spherical-shaped ball onto the fused film.

13. The method of claim 12, wherein the step of forming the surface treatment layer comprises:
a step of debinding the element;
a primarily washing step;
an etching step;
a secondarily washing step;
a surface treatment step;
a tertiarily washing step; and
a drying step.

14. The method of claim 13, wherein the surface treatment step comprises a step of performing one of: chromate treatment, zirconia treatment, and titanium treatment.

15. The method of claim 12, further comprising, after the step of seating the spherical-shaped ball:
a step of placing a plate spring having a cap shape around the element and the spherical-shaped ball; and
a step of inserting the element into a housing, the housing being inserted between confronting surfaces of the sealing part so as to be sealed together with the sealing part.

* * * * *